Sept. 12, 1933.  F. W. JACKMAN  1,926,722
COMPOSITE MOTION PICTURE
Filed Sept. 8, 1931

High Lights Undyed

INVENTOR.
FRED. W. JACKMAN
BY
*W E Beatty*
ATTORNEY.

Patented Sept. 12, 1933

1,926,722

UNITED STATES PATENT OFFICE 1,926,722

COMPOSITE MOTION PICTURE

Fred W. Jackman, Beverly Hills, Calif., assignor to Warner Bros. Pictures, Inc., New York, N. Y., a corporation of Delaware Application September 8, 1931. Serial No. 561,658

3 Claims. (Cl. 88—16)

The invention relates to composite motion pictures, wherein use is made of a dye-toned transparent film of a background scene. This dye-toned transparency may, for example, be placed in the motion picture camera in front of the final negative, the camera photographing action before a background, the action being illuminated with light of a color substantially the same as the color with which the positive transparency is dye-toned, and the plain background behind the action being illuminated with light of a complementary color.

With the above arrangement, it has heretofore been proposed to dye-tone the high lights in the positive transparency, representing the background scene, a neutral shade or color. I have discovered that the above arrangement does not produce in the final negative high lights correctly corresponding to the high lights in the transparency, apparently for the reason that the final negative of the composite picture is underexposed in the high lights, due to the fact that the neutral shade of the high lights in the transparency prevents a sufficient amount of printing light from the background from passing through the transparency to the negative.

I have discovered that this defect may be overcome in the following way: in preparing the dye-toned positive film which shows the background scene, the silver deposit representing the background scene is replaced by a dye of the desired color, whereas the high lights are left clear. In order to insure that the high lights in the positive transparency shall be left undyed, the following precaution should be taken: after dye-toning the positive film, it should be washed in clear water often enough and for a sufficient length of time so that the traces of dye which tend to remain on the high lights are entirely removed.

Figure 1:
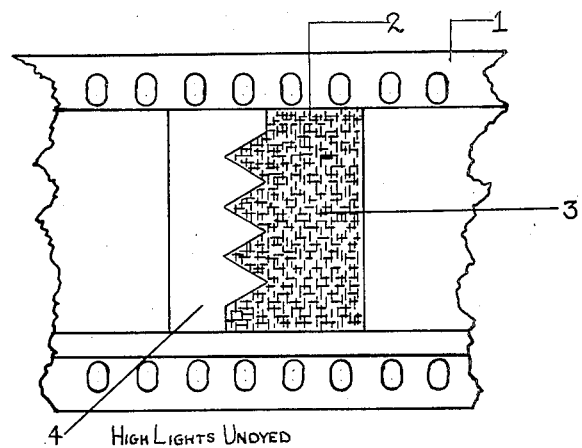
Figure 2:
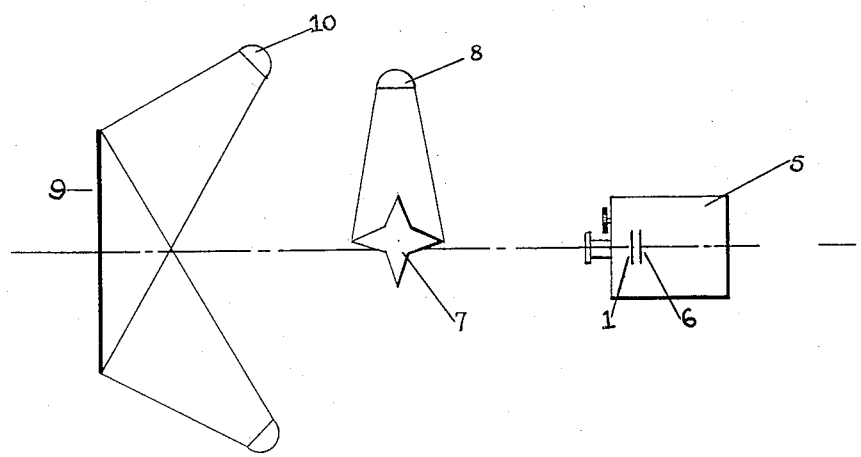

For further details of the invention, reference may be made to the drawing, in which Fig. 1 illustrates a section of a film wherein the silver deposit representing the background scene is replaced by dye, and wherein the high lights are clear, namely, undyed. Fig. 2 represents a camera employing the film in Fig. 1.

The motion picture film 1 in Fig. 1 has a picture frame 2, wherein the background scene 3 has the silver deposit thereof replaced by yellow dye. As above described, after dye-toning the positive transparency 1, the film is washed in clear water to remove the surplus dye so that the high lights 4 of the background scene are clear, namely, undyed.

In order to make use of the transparency in Fig. 1 for making composite pictures, the film 1 is threaded through a motion picture camera 5 in front of the final negative 6. The camera 5 is operated while the action 7, which is illuminated with yellow light from the lamps 8, takes place before an unfigured blue background 9 illuminated with white or blue light from lamp 10. As is well understood in the art, the final negative 6, on exposure, shows the action 7 as though it had actually taken place before the background scene on the transparency 1.

By the use of the above arrangement, the blue printing light from the background 9 passes substantially unimpeded (except, of course, for the interception of light rays by action 7) through the clear high light portion of the film 1, thereby exposing the negative 6 in sufficient amount to form an accurate copy of the high light in the film 1, the action 7 and the background scene on film 1 being photographed on negative 6, as is well understood in the art.

Instead of using blue and yellow lights and yellow dye-toning for the transparency, other substantially complementary colors may be used. Furthermore, the dye-toned transparency may be employed in other ways to produce a composite picture.

I claim:

1. The method which comprises photographing action illuminated with light of a selected color before a backround of a substantially complementary color, through a photograph transparency having clear high lights and having the shades and shadows therein dyed substantially the color of said light.

2. The method according to claim 1, wherein said transparency is a positive film of one scenic component of the composite picture and wherein the silver deposit thereof is replaced by dye of substantially the same color as the color with which said action is illuminated.

3. The method of making composite motion pictures which comprises dye-toning a transparent film of one scenic component of the composite picture, removing the dye from the high lights in said film while leaving the shades and shadows therein dye-toned a selected color, illuminating another component of said composite picture with light of said selected color before a background of a substantially complementary color, placing the dye-toned transparent film with clear high lights before an unexposed film and photographing said foreground component so illuminated with said juxtaposed films.

FRED W. JACKMAN.